United States Patent [19]
Maitrias

[11] 3,983,468
[45] Sept. 28, 1976

[54] MOTOR DRIVE SYSTEM INCLUDING A FEEDBACK LOOP

[75] Inventor: Gerard Maitrias, Brussels, Belgium

[73] Assignee: Burroughs Corporation, Detroit, Mich.

[22] Filed: Dec. 30, 1974

[21] Appl. No.: 537,588

[52] U.S. Cl................................. 318/685; 318/318
[51] Int. Cl.² ....................................... H02K 37/00
[58] Field of Search ............ 318/318, 341, 685, 696

[56] References Cited
UNITED STATES PATENTS

| | | | |
|---|---|---|---|
| 3,443,181 | 5/1969 | Kozol et al............................ | 318/685 |
| 3,523,230 | 8/1970 | York.................................. | 318/138 X |
| 3,628,119 | 12/1971 | Abraham ............................. | 318/685 |
| 3,636,429 | 1/1972 | Jakubowski et al. ................ | 318/685 |
| 3,694,725 | 9/1972 | Abraham et al..................... | 318/685 |

*Primary Examiner*—Gene Z. Rubinson
*Attorney, Agent, or Firm*—Richard A. Jordan; Benjamin J. Barish; William B. Penn

[57] ABSTRACT

A motor drive system is described for driving a stepping motor in accordance with the generation of motion-command-pulses. The drive system includes a timing disc coupled to the motor to produce a feedback pulse for each stepped movement thereof, a timer for measuring a predetermined time interval, means for starting the timer with each generation of a feedback pulse, and means effective upon the generation of a feedback pulse or the run-out of the predetermined time interval, whichever occurs later, for generating a motion-command-pulse and for restarting the timer. The motor thus rotates one increment for each feedback pulse, but its speed is regulated to one in which the time of each increment of movement does not exceed the predetermined time interval of the timer.

The motor drive further includes a high-speed control, a deceleration control, and a stop-sequence control, effected by controlling the generation of the motion-command-pulses in response to the various commands given to the drive system, the arrangement being such that the motor position is never lost.

Also described is a synchronous-sequential-machine implementation of the motor drive system.

25 Claims, 11 Drawing Figures

MOTOR DRIVE SYSTEM INCLUDING A FEEDBACK LOOP

BACKGROUND OF THE INVENTION

The present invention relates to motor drive systems, and particularly to a system including a feedback loop which quickly and precisely controls the position, speed, deceleration and stopping point of the motor.

One application in which the foregoing controls of a motor drive are critical is a movable-head printer in which the printer head is driven to its various positions by means of a multi-phase stepping motor controlled by a train of pulses, called motion-command-pulses, the stepping motor being driven a discrete increment or step with each motion-command-pulse. The starting, speed-regulation, high-speed, deceleration, and stop controls of the motor may all be effected by controlling the motion-command-pulses supplied to the motor driver.

An object of the present invention is to provide an improved motor drive system in which the above motor controls are effected in a precise, fast-acting, and reliable manner. A further object of the invention is to provide a motor drive system which is specially adapted for implementation by Large-Scale-Integrated (LSI) circuits.

BRIEF SUMMARY OF THE INVENTION

In accordance with one aspect of the invention, the motor drive system comprises a motor-starting and speed-regulation control including means sensing the rotation of the motor and generating in response thereto a feedback pulse for each movement of the motor a predetermined increment, timing means for measuring a predetermined time interval after the starting thereof, and means for starting the timer with each generation of a feedback pulse. The apparatus further includes means effective upon the generation of each feedback pulse or the run-out of the predetermined time interval, whichever occurs later, for generating a motion-command-pulse and for restarting the timer. The motor thus rotates one increment for each feedback pulse, but its speed is limited to a predetermined regulated speed in which the time of each increment of movement is not less than the mentioned predetermined time interval.

According to a further feature, the motor drive also comprises a high-speed control including means effective upon the receipt of a HIGH-SPEED command, when the motor is operating at its predetermined regulated speed, to immediately generate an extra motion-command-pulse before the generation of the motion-command-pulse by the next feedback pulse. The motion-command-pulses are thus in a one-phase-advance relationship with respect to the feedback pulses, which accelerates the motor to a speed above its predetermined regulated speed. The high speed the motor finally reaches is limited only by the load it carries.

According to a further feature, the motor drive system comprises a deceleration control including means effective upon the receipt of a DECELERATION command, when the motor is operating at its high speed, to cause the feedback pulse to skip the generation of a motion-command-pulse. When this occurs, the motion-command-pulses are placed in a one-phase-delayed relationship with respect to the feedback pulses. This decelerates the motor until it reaches its predetermined regulated speed, at which time the above-described speed-regulation system takes over to maintain the predetermined regulated speed.

According to a still further feature, the motor drive system also includes a stop control including means effective upon the receipt of a stop control including means effective upon the receipt of a STOP command, when the motor is operating at its predetermined regulating speed, to cause the next feedback pulse to skip the generation of a motion-command-pulse. When this occurs, the motion-command-pulses are again placed in a "one-phase-delayed" relationship with respect to the feedback pulses, which causes the motor to be decelerated from its predetermined regulated speed until it comes to a complete stop.

According to yet another feature, the stop control further includes means for assuring that the motor comes in a complete stop at the end of the predetermined number $n$ of feedback pulses producng $n$ motion-command-pulses subsequent to the one skipped following the "STOP" command. In the described example, $n$ equals 3, so that the motor comes to a complete stop at the end of the third feedback pulse (i.e. after traversing 3 steps or increments), subsequent to the feedback pulse skipped following the STOP command.

In the described embodiment of the invention, the motor-rotation sensing means comprises a timing disc driven by the motor and including evenly spaced sensible elements around its periphery, and a sensor sensing these elements and generating feedback pulses at a rate corresponding to the actual speed of rotation of the motor. The sensible elements in the described embodiment are constituted by teeth of magnetic material carried on the timing disc, and the sensor is a magnetic pick-up device.

According to another advantageous feature of the inventin, the motor drive is implemented by a synchronous sequential machine having a logic gating matrix and a plurality of clocked delay elements, the output of the logic gating matrix being fed to the delay elements, and the output of the latter elements being fed back to the input of the logic gating matrix. Such a system is well adapted for implementation by LSI circuitry, for example Metal-OxideSemiconductor (MOS) circuitry.

According to a still further feature, the means generating the motion-command-pulses selectively generates pulses of a predetermined amplitude to produce a driving torque by the motor, or pulses of a limited amplitude to produce a holding torque by the motor.

An important advantage of a motor drive system constructed in accordance with the foregoing features is that the position of the motor is never lost. Under normal operation there is one motion-command-pulse for each feedback pulse; i.e. the motion-command-pulses are in an "in-phase" relationship with resepct to the feedback pulses. Even though the motion-command-pulses are brought in a one-phase-advanced relationship during acceleration, and a one-phase-delayed relationship during deceleration, this relationship is kept track of the normal in-phase relationship is restored before the motor comes to a complete stop. In addition, whenever the motor comes to a complete stop. In addition, whenever the motor is stopped, it moves exactly a predetermined number (3 in our example) of steps before coming to a complete standstill. Thus, the system knows exactly where the article driven by the motor is at any particular time.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENTS

In order to aid in better understanding the invention, it is first described below with respect to a generalized form shown in FIGS. 1–4, in which the logical operations of the various motor controls are illustrated particularly by the diagrams of FIGS. 2a and 2b; and it is then described with respect to an LSI Synchronous-Sequential-Machine implementation shown in FIGS. 5–9, the latter including a Motor State Machine operating according to the Machine State Diagram of FIG. 8.

GENERALIZED FORM (FIGS. 1–4)

General System

Figure 1:
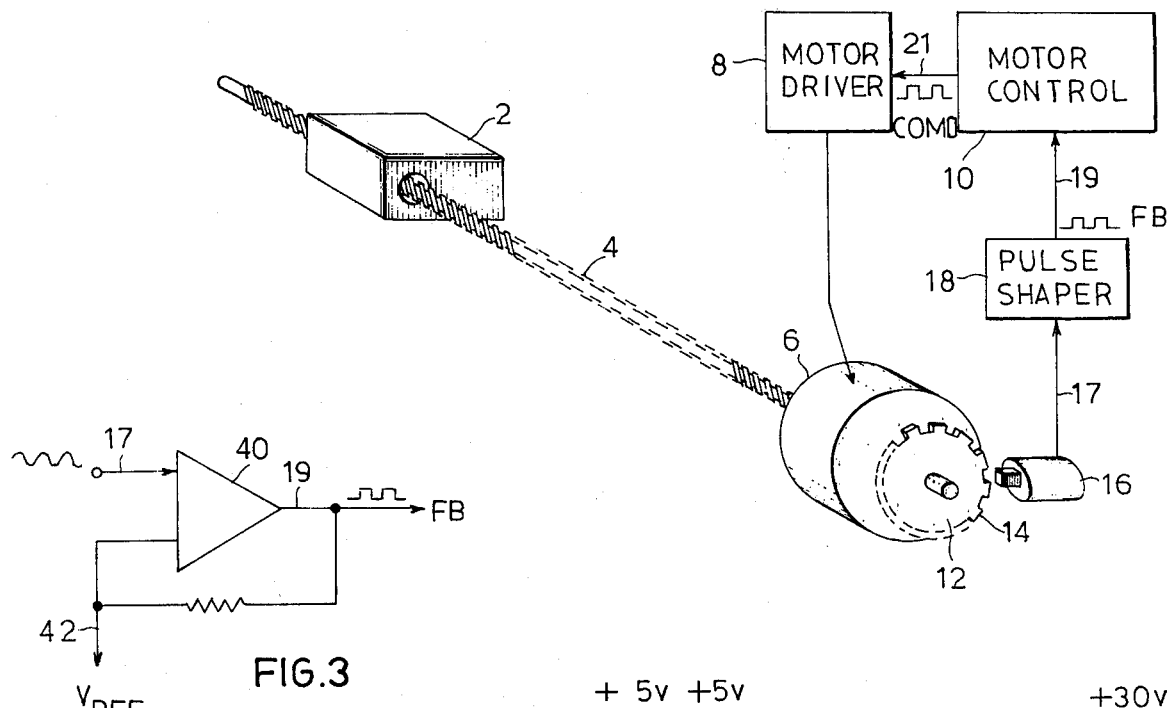
FIG. 1 is a block diagram of a motor drive system constructed in accordance with the invention for precisely positioning the printing head of a movable-head printer.
Figure 3:
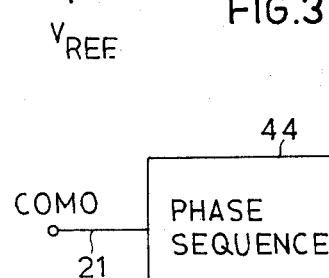
FIG. 3 is a block diagram illustrating the pulse-shaper circuit for producing constant-amplitude feedback pulses in the system of FIG. 1.

The embodiment of the invention described in generalized form in FIGS. 1–4 is a motor drive system for driving the printing head of a serial printer, such as a matrix-needle printer. The printing head, generally designated 2 in FIG. 1, is carried by a rotatable screw 4 driven by a stepping motor 6. The motor is stepped an increment of rotation with each motion-command-pulse COMO supplied thereto by the motor driver circuit 8, the latter being controlled by a motor control circuit 10.

The motor drive system includes a feedback loop having means sensing the rotation of the motor and generating in response thereto a feedback pulse FB for each movement of the motor a predetermined increment. In the described embodiment illustrated in FIG. 1, the motor rotation sensing means comprising a timing disc 12 coupled to the motor shaft so as to be rotated in accordance with its speed. Timing disc 12 includes a plurality (e.g. 200) evenly spaced sensible elements in the form of magnetic teeth 14 around the periphery of the disc. The magnetic teeth are sensed by a magnetic pick-up sensor 16 which generates a feedback pulse with each increment of rotation of the motor. These pulses are fed via line 17 to a pulse-shaper 18 to produce the square-wave feedback pulses FB which are inputted via line 19 to the motor control circuit 10, the latter circuit producing the motion-command-pulses COMO fed via line 21 to the motor drive circuit 8 for driving the stepping motor 6. The various controls effected by circuit 10 of FIG. 1 are generally illustrated in the block diagram of FIG. 2, and are described more particularly below the reference to FIGS. 2a and 2b.

Figure 2:
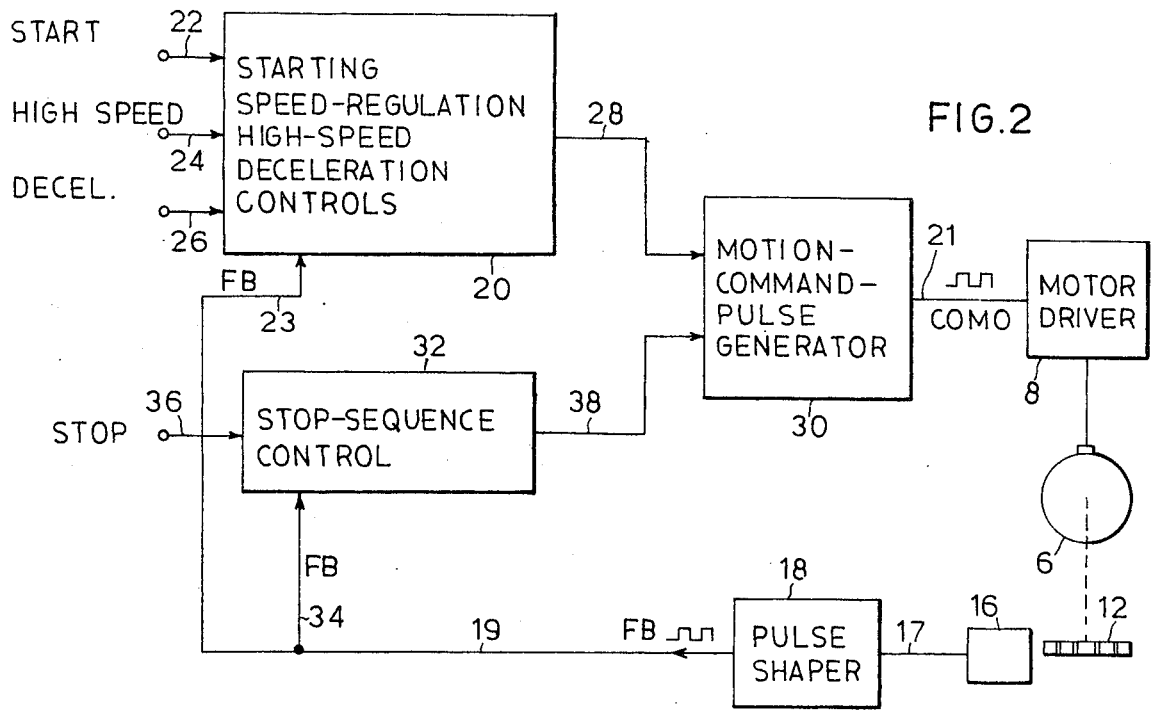
FIG. 2 is a block diagram illustrating various controls of the motor drive system of FIG. 1, FIG. 2a being a logic diagram schematically illustrating the Starting, Speed-Regulation, High-Speed, and Deceleration controls of the motor drive, and FIG. 2b being a similar diagram illustrating the Stop-Sequence control.

Briefly, this circuit includes Motor Starting, speed-regulation, High-Speed, and Deceleration controls, all being included within block 20 of FIG. 2. The inputs to the circuit of block 20 include the feedback pulses FB from the pulse-shaper circuit 18 supplied via line 23, a START command supplied via input line 22, a HIGH-SPEED command supplied via input line 24, and a DECELERATION command supplied via input line 26. The circuit block 20 controls, via its output line 28, a generator 30 which generates the motion-command-pulses COMO supplied to the motor-driver circuit 8 which drives the stepping motor 6. The logic of the control circuit within block 20 is more particularly described below with reference to FIG. 2a.

The control circuit of block 10 of FIG. 1 further includes a Stop-Sequence control shown by block 32 in FIG. 2, having, as inputs, the feedback pulses FB supplied via line 34 and the STOP command supplied via line 36. The output of circuit 32 controls, via its ouput line 38, the motion-command-pulse generator 30 generating the COMO pulses supplied to the stepping motor driver circuit 8. The logic of the Stop-Sequence control circuit 32 is more particularly described below with reference to FIG. 2b.

The pulse-shaper 18 of FIG. 1 may be of any conventional circuit which receives the varying signals from the magnetic pick-up device 16 and produces uniform square-wave feedback pulses FB. Such a circuit is illustrated for purposes of example in FIG. 3 as including a voltage comparator 40 receiving the signals from magnetic pick-up 16 via input line 17 and comparing same with a voltage reference applied via line 42 to produce the square-wave feedback pulses FB applied via line 19 to the motor control circuit 10 in FIG. 1.

The motor-driver circuit 8 in FIG. 1 may also be a conventional circuit for driving a multi-phase stepping motor. In the example illustrated, stepping motor 6 is of four phases, and therefore the driver includes a phase-sequencer to apply the driving pulses to the four phases of the stepping motor in the proper sequence, such that the motor is stepped one increment for each COMO pulse.

Figure 4:
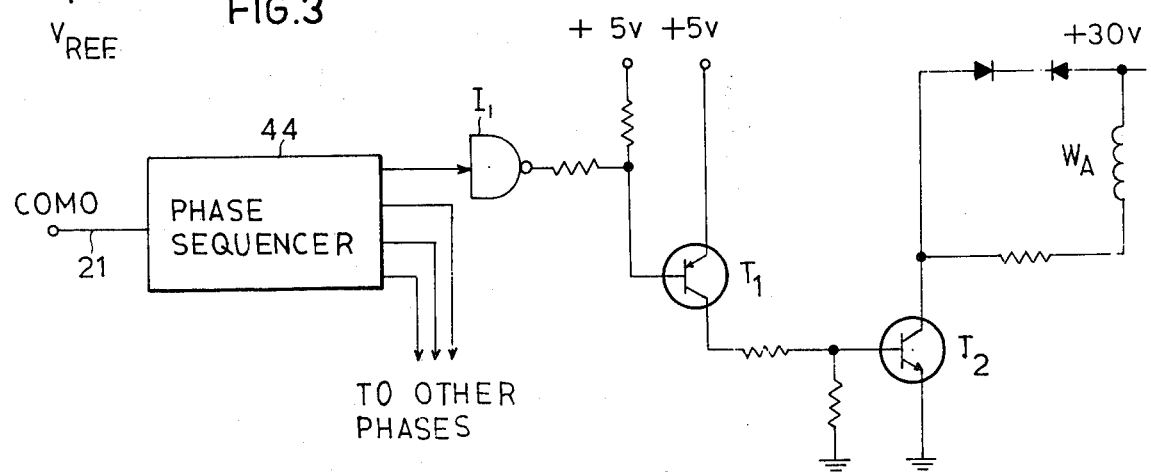
FIG. 4 is a diagram illustrating the motor driver circuit in the system of FIG. 1.

FIG. 4 schematically illustrates the motor-driver circuit 8 as including a phase-sequencer 44 receiving the motion-command-pulses COMO, and supplying the drive pulses to the four motor winding phases in proper sequence. Only the motor winding WA (phase A) is illustrated in FIG. 4. The output of the phase-sequencer is inverted in inverter $I_1$, and is fed to the base of a switching transistor $T_1$. The collector of transistor $T_1$ is connected to the base of a driver transistor $T_2$, and the respective phase $W_A$ of the stepping motor is connected in series with the emitter-collector circuit of transistor $T_2$ so as to receive a drive pulse whenever its phase is pulsed by the phase-sequencer 44 controlled by the COMO pulse.

The motion-command-pulses COMO generated by the feedback pulses FB control the motor rotation such that during its normal operation (Speed-Regulation mode), a COMO pulse is generated for each FB pulse; the COMO pulses are thus in phase with the FB pulses. However, when the motor is to be operated in the Acceleration mode, either in response to a START command or to a HIGH-SPEED command, an extra COMO pulse is generated, bringing the COMO pulses in a one-phase-advanced relationship with respect to the FB pulses; this causes the motor to accelerate. When the motor is to be operated in the Deceleration mode, either in response to a DECELERATION command or to a STOP command, a COMO pulse is caused to be skipped, bringing the COMO pulses in a one-phase delayed relationship with respect to the FB pulses; this causes the motor to decelerate.

The specific motor controls for accomplishing the foregoing functions, included within block 10 of FIG. 1, are individually described below particularly with reference to FIGS. 2, 2a and 2b.

Starting and Speed-Regulation Controls

The starting and Speed-Regulation controls of the stepping motor 6, as included within block 20 of FIG. 2, function as follows, reference being made particularly to the logic diagram of FIG. 2a.

Assuming the motor is at rest, as soon as the drive system receives a START command, it generates a motion-command-pulse COMO which is applied to the stepping motor to start it rotating. This is logically illustrated in FIG. 2a wherein it will be seen that the START command inputted via line 22 is applied via OR-gate $G_1$ to the motion-command-pulse generator 30, which generates a motion-command-pulse COMO supplied to the motor driver circuit 8 of the stepping motor 6.

The motor thus rotates one increment, and as it does, the timing disc 12 coupled thereto causes the magnetic pick-up device 16 to generate a pulse which is shaped by pulse-shaper 18 into a square-wave feedback pulse FB. This causes the generation of another motion-command-pulse COMO, which steps the motor another increment, to generate another feedback pulse FB, and so on. The motor thus quickly accelerates, continuously generating feedback pulses FB having a time interval $T_{FB}$ which decreases with increasing motor speed.

The speed at which the motor is to be regulated is determined by this time interval, $T_{FB}$, between feedback pulses FB, particularly when it decreases to a predetermined value. In the described example, the predetermined time interval is 1 ms, and is determined by a timer ($TS_1$ in FIG. 2a). As soon as time interval $T_{FB}$ between the feedback pulses FB is less than the predetermined time interval (1 ms), the next feedback pulse FB is not used for generating the motion-command-pulse COMO to drive the motor, but rather there is used the run-out of the timer for this purpose.

The stepping motor 6 thus rotates one increment for each feedback pulse FB, but its speed is limited to a predetermined regulated speed in which the time of each increment of movement is not less than a predetermined time interval. In our example the predetermined time interval is 1 ms for each increment (one tooth 14 on timing disc 12) of motor movement.

Figure 2A:
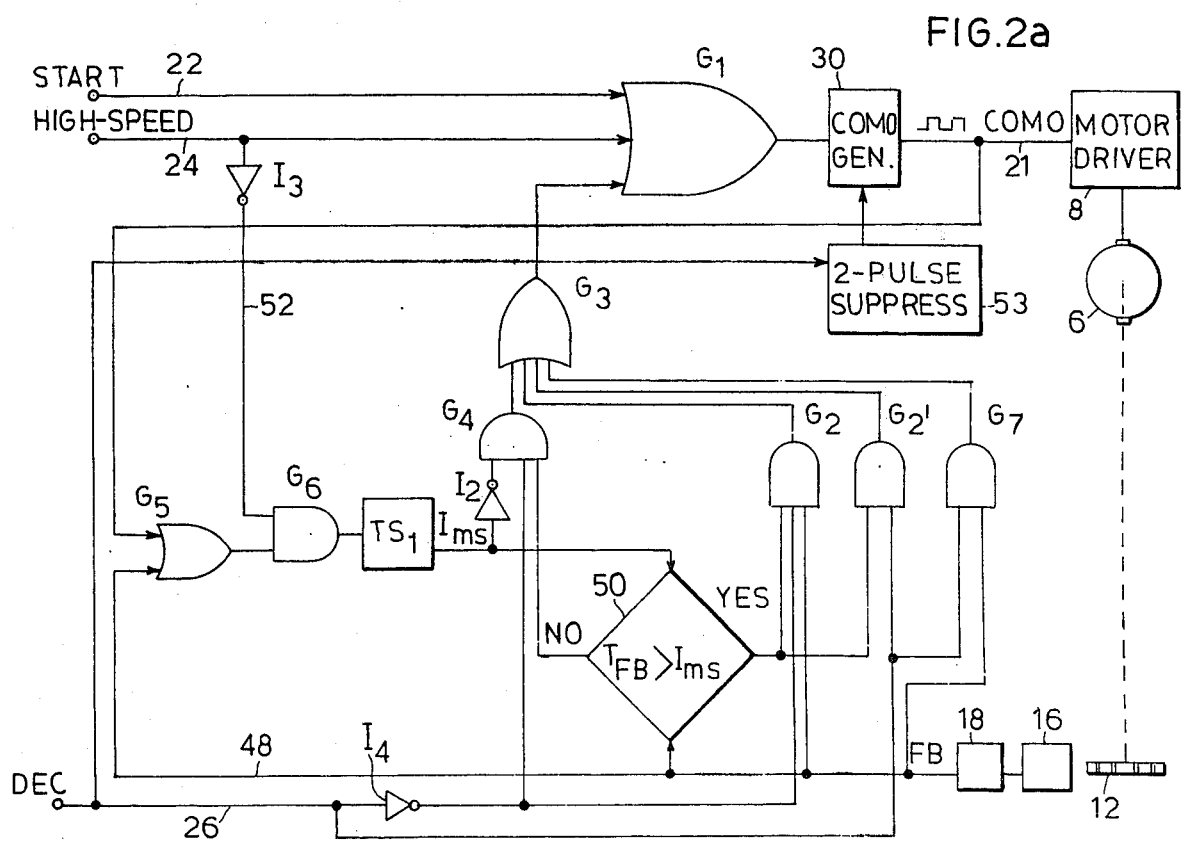

The foregoing operation of the Speed-Regulation control is logically illustrated in FIG. 2a, wherein it will be seen that the feedback pulses FB generated by the rotation of the timing disc 12 coupled to the stepping motor 6, are applied via line 48 to timer $TS_1$ which measures the predetermined time interval (in our case, 1 ms) from the time it receives the feedback pulse. A decision box 50 receives the output of timer $TS_1$ and also the feedback pulses FB, and decides whether the time interval $T_{FB}$ between the feedback pulses FB is greater or less than the predetermined time interval, (1 ms) of the timer. When $T_{FB}$ is greater than 1 ms, which it will be during the starting of the motor as it accelerates to regulated speed, the feedback pulses FB are used for generating the motion-command-pulses COMO supplied to the stepping motor 6, this being logically illustrated in FIG. 2a by AND-gate $G_2$ and OR-gate $G_3$. On the other hand, whenever the time interval $T_{FB}$ between the feedback pulses FB is less than 1 ms, which will occur when the motor speed just passes its predetermined regulated speed, the run-out of the signal from the timer TS, and not the feedback pulse FB, is used for generating the motion-command-pulse COMO, this being logically shown in FIG. 2a by inverter $I_2$, AND-gate $G_4$, and OR-gate $G_3$.

FIG. 2a also logically shows that the timer $TS_1$ is reset with each feedback pulse FB or motion-command-pulse COMO, whichever occurs later, this being provided by OR-gate $G_5$ connected to reset, i.e., restart, timer $TS_1$ each time either of the above pulses is produced. The timer $TS_1$, however, is not restarted when a HIGH-SPEED command is given, as will be apparent from the description below of the High-Speed control. This is logically shown in FIG. 2a by path 52 from the High-Speed input line 24, which path includes inverter $I_3$ and AND-gate $G_6$, gate $G_6$ being disabled by the presence of a HIGH-SPEED command to prevent the timer $TS_1$ from being restarted by the next feedback pulse FB or motion-command-pulse COMO, whichever occurs first.

It is thus seen that as soon as the START command is given, the stepping motor 6 is started and is quickly accelerated until it reaches a predetermined speed, at which speed it is regulated. The position of the motor is never lost because a feedback pulse FB is generated with each step or increment of movement of the motor, and the COMO pulses driving the motor are in an "in-phase" relationship with the feedback pulses during this mode of operation. At starting, the time interval $T_{FB}$ between feedback pulses is greater than the predetermined 1 ms, and at this time each feedback pulse is used to generate a motion-command-pulse COMO; but as soon as, and whenever thereafter, the time interval $T_{FB}$ is less than 1 ms, the run-out of the timer ($TS_1$) is used for generating the motion-command-pulse COMO, thereby causing the motor to decrease its speed until the interval between feedback pulses FB no longer exceeds 1 ms. In the example illustrated the regulated speed is one step (defined by one tooth 14 on timing disc 12, i.e., 1/200 revolution) per 1 ms.

High-Speed Control

Should the motor drive system, when the motor is operating at its predetermined regulating speed, receive a HIGH-SPEED command, an extra motion-command-pulse COMO is immediately generated before the generation of the motion-command-pulse by the next feedback pulse FB. The COMO pulses are thus in a one-step-advanced relationship with respect to the feedback pulses FB. This immediately accelerates the motor, which acceleration continues to a speed limited only by the load the motor drives.

The foregoing High-Speed control is also logically illustrated in FIG. 2a, wherein it will be seen that the HIGH-SPEED command, applied via input line 24, is fed through OR-gate $G_1$ to the motion-command-pulse generator 30 to generate an additional COMO pulse which is supplied to motor-driver 8 for the stepping motor 6.

The HIGH-SPEED command also disables the above-described Speed-Regulation control including timer $TS_1$. FIG. 2a logically illustrates this function by having its inverted signal disable AND-gate $G_6$ as mentioned earlier.

Deceleration Control

The Deceleration Control within block 20 of FIG. 2 functions as follows: Assuming the motor control system is operating in the High-Speed one-phase-advanced mode, as soon as control block 20 receives a DECELERATION command, via input line 26, it causes the next feedback pulses FB to skip the generation of two motion-command-pulses COMO. This brings the COMO pulses into a one-step-delayed relationship with respect to the feedback pulses, which immediately decelerates the motor until its predetermined regulated speed is reached. At that time an extra motion-command-pulse COMO is immediately generated, before the generation of the COMO pulse by the next feedback pulse FB, thereby bring the COMO pulses into an in-phase relationship with the FB pulses. The above-described Speed-Regulation control then takes over to maintain the motor at its regulated speed.

The foregoing operation of the Deceleration control is also logically illustrated in FIG. 2a, wherein it will be seen that the DECELERATION command on input line 26 is inverted by inverter $I_4$ and is applied to AND-gates $G_2$ and $G_4$ to inhibit the Speed-Regulation control. At the same time, the DECELERATION command is applied to a 2-pulse suppresser circuit 53 which is effective to cause the motion-command-pulse COMO generator 30 to skip the generation of two COMO pulses by the next two FB pulses, whereby the COMO pulses are brought from a one-phase-advanced relationship to a one-phase-delayed relationship with respect to the feedback pulses FB. This quickly decelerates the motor. During the deceleration, the feedback pulses FB continue to cause the generation of he motion-command-pulses COMO, this being shown by AND-gate $G_7$ enabled by the DECELERATION command to pass the feedback pulses FB to the COMO generator via OR-gates $G_3$ and $G_1$.

The deceleration continues until the time interval $T_{FB}$ between feedback pulses FB becomes greater than 1 ms, at which time an extra motion-command-pulse COMO is generated to bring them back into an "in-phase" relationship with respect to the feedback pulses. The latter is logically shown in FIG. 2a by AND-gate $G_2'$ which is enabled by the DECELERATION command to feed an extra pulse to COMO generator 30, via OR-gates $G_3$ and $G_1$, as soon as decision box 50 determines what the time interval $T_{FB}$ between feedback pulses FB is greater than 1 ms.

Stop-Sequence Control

The motor control circuit 10 of FIG. 1 also includes a Stop-Sequence control which is effective, upon the receipt of a STOP command when the motor is operating at its predetermined regulated speed, to bring the motor to a quick and precise stop according to a specific sequence of actions. When the Stop-Sequence control is actuated, it first causes the next feedback pulse FB to skip the generation of a motion-command-pulse COMO, whereby the COMO pulses are immediately brought into a one-phase-delayed relationship with respect to the feedback pulses FB; this quickly decelerates the motor. The Stop-Sequence control then retains control until the motor comes to a complete stop at a precise position.

An important feature of the novel motor drive system is that the Stop-Sequence control effects a complete stop of the motor at the end of the predetermined number $n$ of steps; each step produces a feedback pulse FB which in turn produces a motion-command-pulse COMO subsequent to the one skipped following the STOP command. In the example illustrated $n = 3$. Thus, the motor comes to a complete stop after three feedback pulses FB (i.e. after traversing 3 steps on timing disc 12) subsequent to the feedback pulses FB skipped following the STOP command. Accordingly, as in the case of the previously described operations, the motor position is also never lost during the Stop-Sequence operation.

More particularly, the Stop-Sequence control includes means effective, upon the generation of each feedback pulse FB subsequent to the one skipped following the STOP command, to generate a motion-command-pulse COMO. It further includes means effective upon the generation of the $n-1$th (second, in the described example) one of the latter feedback pulses for starting a timer to measure a second predetermined time interval (2ms, in the described example); and means effective to generate the $n$th (third, in the described example) motion-command-pulse COMO upon the run-out of the second predetermined time interval or upon the generation of the $n$th feedback pulse FB, whicheer occurs sooner. Thus, the motor comes to a complete stop precisely after the generation of the $n$th (third) motion-command-pulse COMO, which occurs when the motor has traversed precisely $n$ (three) steps on the timing disc 12.

Figure 2B:
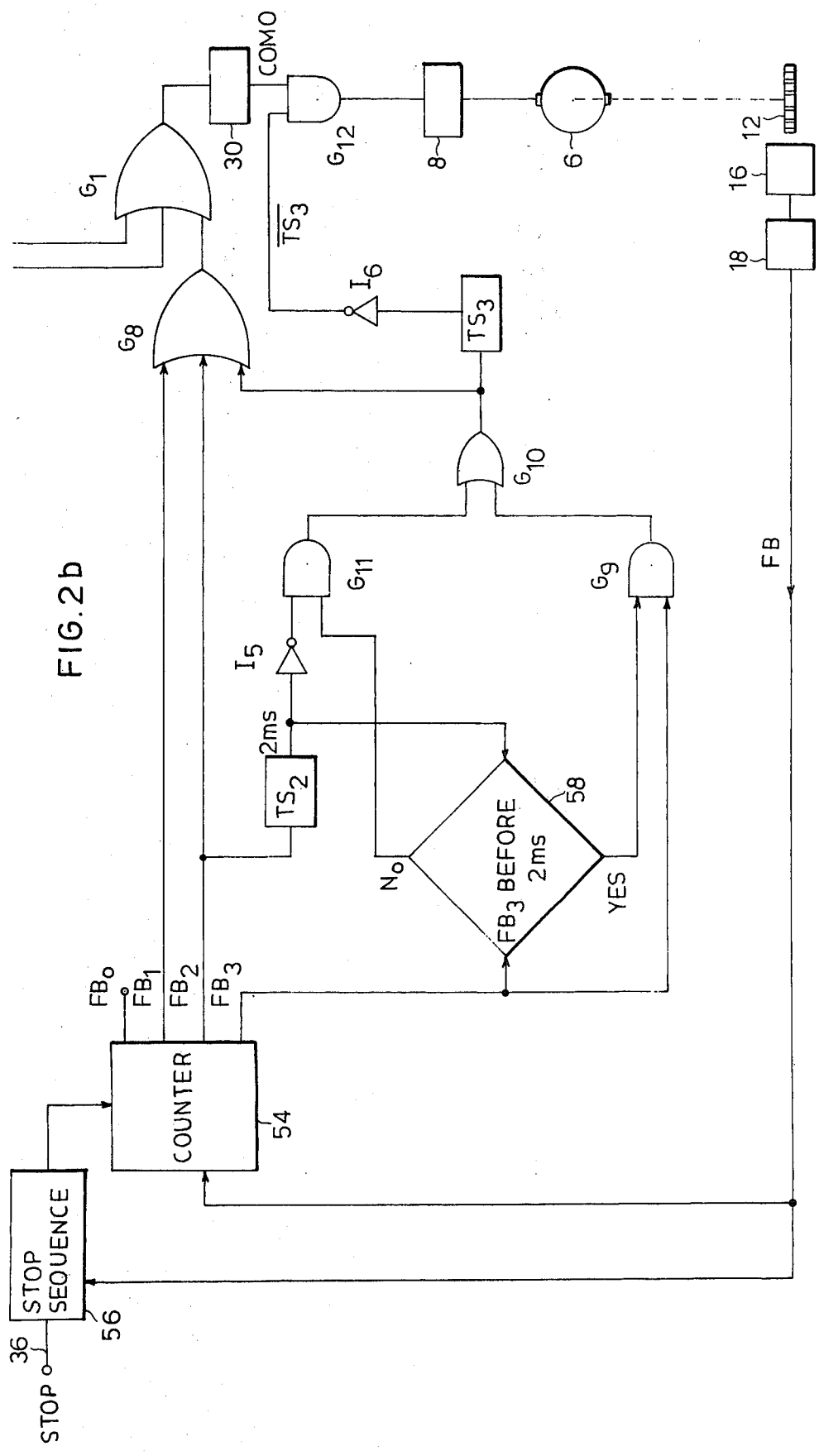

FIG. 2b logically illustrates the foregoing operation of the Stop-Sequence control.

Thus, FIG. 2b schematically illustrates the feedback pulses FB, generated by the rotation of the timing disc 12 coupled to the motor, as being fed to step a four-stage counter 54 enabled by a Stop-Sequence circuit 56 when the latter circuit receives the STOP command via its input line 36. When the Stop-Sequence circuit 56 is activated, it causes the next feedack pulse ($FB_0$) applied to counter 54 to skip the generation of a motion-command-pulse COMO, this being schematically illustrated by showing the first output stage of counter 54 as being unconnected. Thus, the motor is now in a one-phase-delayed, or Deceleration, mode.

The first feedback pulse ($FB_1$), after the one skipped upon the actuation of the Stop-Sequence circuit 56, is outputted via OR-gate $G_8$ and the previously-mentioned OR-gate $G_1$ to the motion-command-pulse-generator 30 to generate a COMO pulse to be supplied to the motor driver circuit 8.

The next feedback pulse $FB_2$ is similarly outputted via gates $G_8$ and $G_1$ to generate a COMO pulse. At the same time, this second feedback pulse $FB_2$ starts a timer $TS_2$ to measure a second predetermined time interval, this being 2 ms in the described example.

This time interval is used to measure the time of occurrence of the third and last feedback pulse $FB_3$ subsequent to the one skipped following the STOP command. If the third feedback pulse $FB_3$ is generated before the predetermined time interval (2 ms) runs out, a motion-command-pulse COMO is generated with that feedback pulse, which brings the motor back into phase with the feedback pulses; this possibility is logically shown by decision box 58 whose "YES" output enables AND-gate $G_9$ to pass feedback pulse $FB_3$ via OR-gates $G_{10}$, $G_8$, $G_1$, to generate the third and last motion-command-pulse COMO.

On the other hand, it may be that the motor is under a heavy load and therefore is rotating, at this stage, at such a low speed that the predetermined time inteval (2 ms) runs out before the motor-driven timing disc 12 generates the third and last feedback pulse $FB_3$. If this occurs, the third and last motion-command-pulse COMO is generated to the stepping motor when this 2 ms time runs out, this being logically shown in FIG. 2b by the path incuding the "NO" output of decision box 58, which enables AND-gate $G_{11}$ to pass the inverted (by inverter $I_5$) timer signal through gates $G_{10}$ and $G_8$ to generate the last COMO pulse.

The foregoing arrangement assures that the motor will not come to a complete stop until it has moved three steps on the timing disc 12, and thus further assures that the motor never loses its position.

The stop control further includes means effective upon the generation of the last feedback pulse $FB_3$ for starting a timer to measure a third predetermined time interval, and further means for disabling the restarting of the motor until the run-out of that time interval. The purpose of this feature is to disable the motor for a certain time period (e.g., 40 ms) as it comes to a complete stop, because at this stage it may "hunt" which could produce false signals tending to restart the motor. Thus, once the motor stops, it is disabled from restarting for this predetermined time interval (40 ms).

The foregoing is logically illustrated in FIG. 2b by the provision of timer $TS_3$ which is started, to measure the 40 ms time interval, as soon as the third and last motion-command-pulse COMO is generated. Subsequent motion-command-pulses COMO are disabled to prevent an erroneous restart of the motor until this 40 ms time interval runs out, this being assured by inverter $I_6$ which inverts the output of timer $TS_3$, and AND-gate $G_{12}$ which blocks any subsequent motion-command-pulse COMO from being fed to the motor driver so long as the timer has not run out.

SYNCHRONOUS-SEQUENTIAL-MACHINE IMPLEMENTATION (FIGS. 5–9)

General System

As pointed out earlier, one of the important advantages of the present invention is that it can be implemented by a synchronous sequential machine, particularly one constructed by the use of LSI circuitry, especially MOS circuitry. FIGS. 5–9 illustrate the implementation of the invention by using a synchronous sequential machine, the various states of which are shown in the state diagram of FIG. 8.

Figure 5:
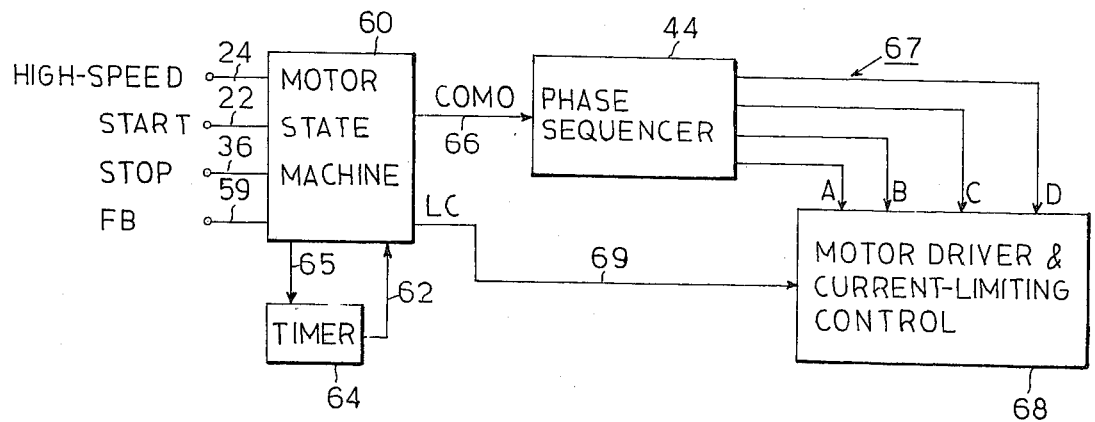
FIG. 5 is a block diagram of another form of motor control circuit in the system of FIG. 1, this form particularly illustrating how it may be implemented by a Synchronous Sequential Machine including LSI circuitry.

As shown in FIG. 5, the feedback pulses FB derived from the timing disc 12 coupled to the motor as described above, constitute one input via line 59 to the motor state machine 60. The latter machine incudes, as additional inputs, the START command on its input line 22, the HIGH-SPEED command on its input line 24, and the STOP command on its input line 36. The DECELERATION command is automatically generated at the termination of the HIGH-SPEED command to return the motor to its regulated speed. The state machine includes an additional input line 62 from timer 64, which it in turn controls via line 65 as will be described more fully below.

The motor state machine 60 includes two outputs, in addition to output line 65 to timer 64. One output is the motion-command-pulses COMO which are applied via line 66 to the phase-sequencer 44 for producing the four phase (A–D) pulses fed via line 67 to the motor driver and current-limiting circuit 68, such that the motor is stepped one increment for each COMO pulse. The other output is a limited-current signal LC on its output line 69, which output is applied to motor driver circuit 68 to provide a limited current to the phase windings of the stepping motor; this produces a holding torque while minimizing heat dissipation.

Figure 7:
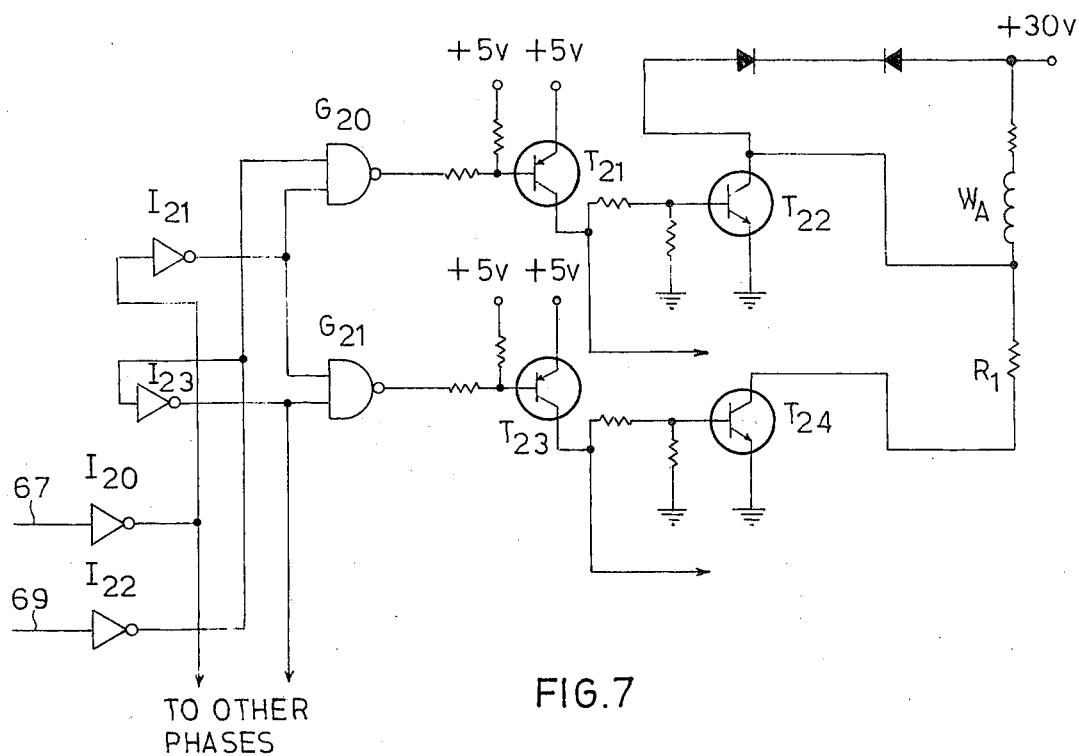
FIG. 7 is a diagram illustrating the motor-driver and current-limiting circuit in the system of FIG. 5.

The motor driver and current-limiting circuit within block 68 is more particularly illustrated in FIG. 7. This figure shows only the input of one phase (e.g. phase A) from the phase sequencer 44, and the limited-current signal LS inputted via line 69, it being appreciated that the circuitry for the other phases would be similar.

The motor-driver circuit 68 receiving the input signal on line 67 from the phase-sequencer 44 includes a pair of inverters $I_{20}$, $I_{21}$ which, after two inversions, apply the original polarity signal as one input to each of a pair of NAND-gates $G_{20}$, $G_{21}$.

Gate $G_{20}$ corresponds to inverter $I_1$ of FIG. 4 and, when enabled by the absence of the limited-current signal LC applied via line 69 and inverter $I_{22}$, controls switching transistor $T_{21}$ (corresponding to $T_1$, FIG. 4) which in turn controls driving transistor $T_{22}$ (corresponding to transistor $T_2$, FIG. 4) for applying the driving pulses (phase A) to winding $W_A$ of the stepping motor.

Gate $G_{21}$ is a limited-current circuit including a second pair of transistors $T_{23}$, $T_{24}$ which introduce a resistor $R_1$ in the motor winding circuit when the LC signal is present. The limited-current signal LC is inputted via line 69 from the motor state machine 60 (FIG. 5), after a double-inversion in inverters $I_{22}$, $I_{23}$, and is applied (in its original polarity) to NAND-gate $G_{21}$. The second input to gate $G_{21}$ is the phase A drive pulse after it has experienced two inversions ($I_{20}$, $I_{21}$) as described above.

The arrangement is such that if a drive pulse is outputted from phase-sequencer 44 via line 67 when a limited-current signal LC on line 69 is absent, transistor $T_{22}$ is switched on so that the motor phase winding $W_A$ receives full driving current; whereas if the drive pulse is outputted when limited-current signal LC is present, transistor $T_{22}$ is switched-off and transistor $T_{24}$ is switched on so that the motor phase winding $W_A$ receives only limited current via resistor $R_1$. This limited current provides a holding torque while minimizing heat dissipation.

Motor State Machine

Figure 6:
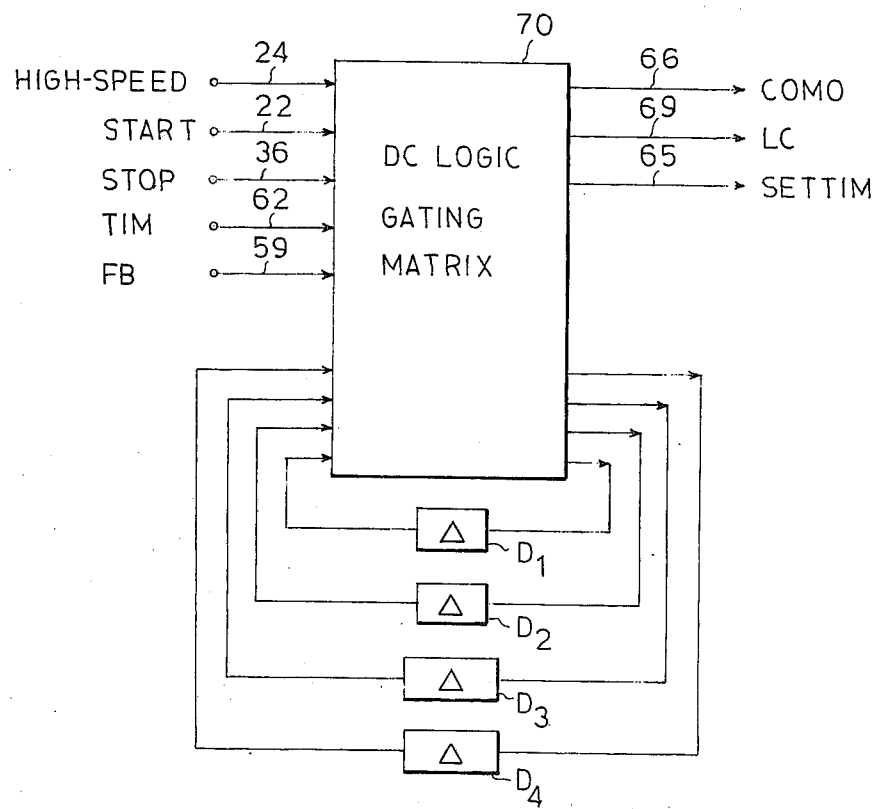
FIG. 6 is a block diagram illustrating the Synchronous Sequential Machine in the system of FIG. 5, particularly showing the staticlogic gating matrix including its plurality of clocked delay elements and its various inputs and outputs.
Figure 8:
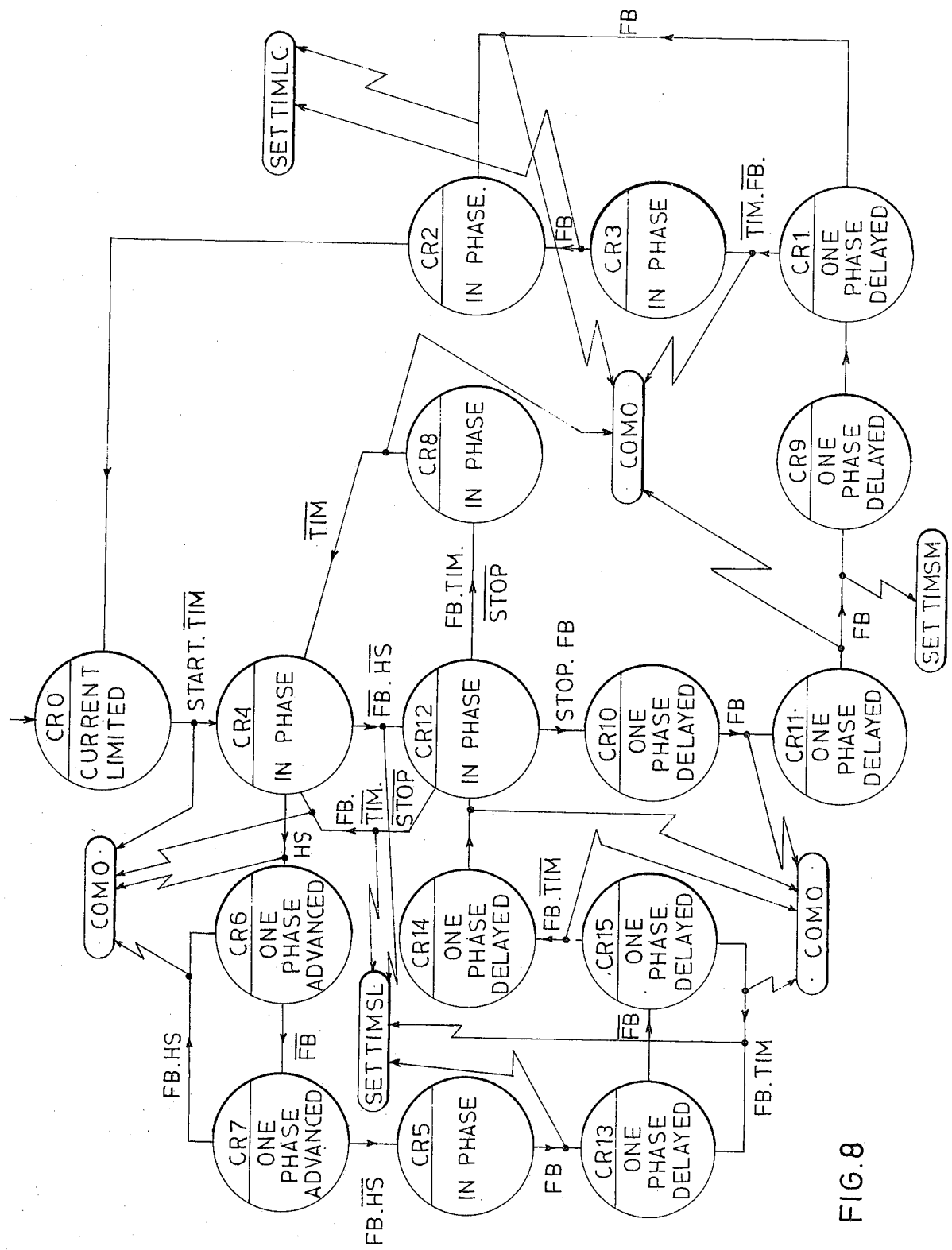
FIG. 8 is a state diagram illustrating the operation of the Synchronous Sequential Machine of FIGS. 5 and 6.

The motor state machine 60 of FIG. 5 is more particularly illustrated in the block diagram of FIG. 6 and the state diagram of FIG. 8.

A synchronous sequential machine, as well known, can be defined as a logic network with outputs that are a function of the present input and of the prior sequence of inputs. Such a machine may be reduced to the form illustrated in FIG. 6, shown by block 70, followed by clock delay elements whose outputs feed back into the logic matrix. The machine may have any number of inputs, display elements, or outputs, depending upon the application.

In the example illustrated in FIGS. 5 and 6, there are the five inputs discussed above, represented by input lines 22, 24, 36, 59 and 62, and the three outputs also discussed above, represented by output lines 65, 66 and 68. This example has 16 states (arbitrarily referred to as states CRO-CR15 in FIG. 8), and therefore four clocked delay elements D1-D4 are required as shown in FIG. 6.

The sequential operation of the machine illustrated in FIG. 6 is described by the state diagram of FIG. 8. This diagram shows all 16 states (CRO-CR15) that the machine can be in. Also shown in FIG. 8 are the controls effected during state changes for generating the motion-command-pulses COMO, and also for starting the timer according to any one of three modes to measure any one of the above-described three time intervals, as follows: timer speed-limit mode (TIMSL), e.g. 1 ms, corresponding to timer $TS_1$ in FIG. 2a; timer stepping mode (TIMSM), e.g. 2 ms, corresponding to timer $TS_2$ in FIG. 2b; and timer limitcurrent mode (TMLC), e.g. 40 ms, $TS_3$ in FIG. 2b.

The control inputs that cause state changes are shown beside each state change path. A dot between the control inputs designates an "AND" condition is required, and a bar over the control input designates a NOT condition is required. Thus, FIG. 8 shows that the state change from CRO to $CR_4$ requires a START command and the absence of a timer signal (in this case, TMLC = 40 ms) from timer 64 in FIG. 5, (i.e. START.$\overline{TIM}$); and that when these conditions are met, the machine changes from state CRO to state $CR_4$ and generates a motion-command-pulse COMO.

The specific circuitry used for the motor state machine may take a number of different designs. Dynamic MOS LSI circuits are particularly advantageous, and since such techniques are well known (being described for example in the book "MOS Integrated Circuits — Theory, Fabrication, Design and Systems Applications of MOS LSI", published by Van Nostrand Reinhold Company, New York, 1972, pages 288–306), it is not deemed necessary, nor even desirable to describe a specific circuit here as this would merely unduly lengthen the description.

Figure 9:
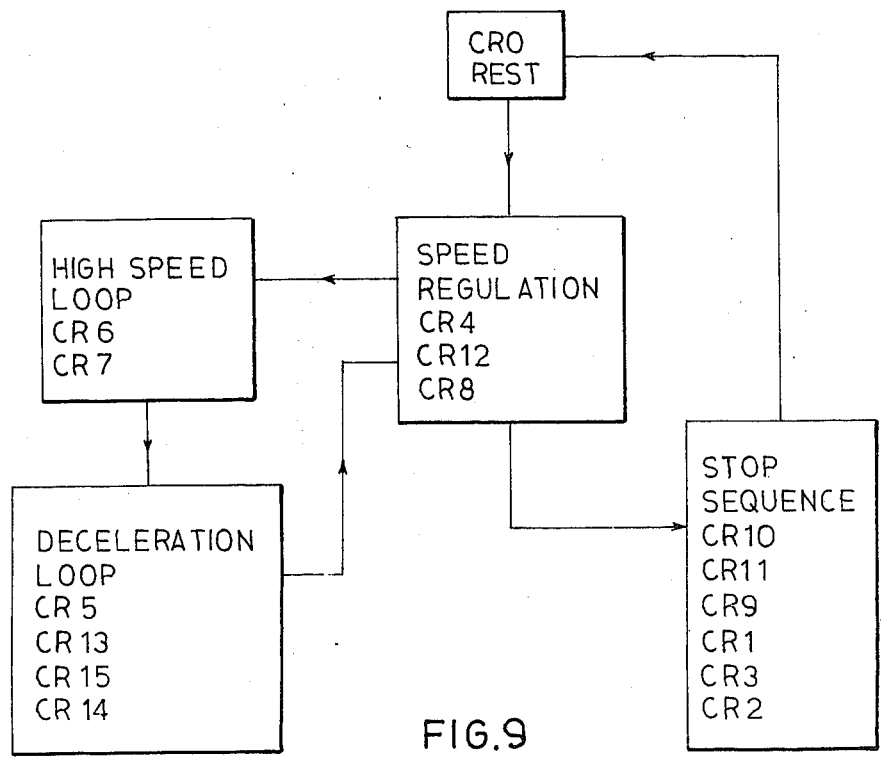
FIG. 9 is a block diagram illustrating the main loops of the Synchronous Sequential Machine.

Each motor control of the drive system involves a number of states or loops. These are illustrated in FIG. 9 as follows: state CRO represents the rest condition of the state machine, in which the motor receives limited-current to produce a holding torque; states $CR_4$, $CR_{12}$ and $CR_8$ are in the Speed-Regulation control loop; states $CR_6$ and $CR_7$ are in the High-Speed control loop; states $CR_5$, $CR_{13}$, $CR_{15}$ and $CR_{14}$ are in the Deceleration control loop; and states $CR_{10}$, $CR_{11}$, $CR_9$, $CR_1$, $CR_3$, and $CR_2$ are in the Stop-Sequence control loop. These control loops are individually described below.

Starting and Speed-Regulation Control Loop

As indicated earlier, state CRO designates the rest condition of the machine. In this condition, stepping motor 6 does not receive any motion-command-pulses COMO via line 66 (FIG. 5), and therefore is in its rest condition; but it does receive a limited-current signal LC (via line 69, FIG. 5) so that the motor produces a holding torque with lowered power dissipation, as described earlier.

As soon as the motor state machine receives the START command, (via line 22, FIG. 5) and assuming the timer (40 ms) set at the end of the preceding operation as described below has run out (START.$\overline{TIM}$), the machine switches from state CRO to $CR_4$. In doing so, it generates a motion-command-pulse COMO, which pulse is supplied via output line 66 to drive the motor one step.

As the motor starts to rotate, but before it generates a feedback pulse FB from its timing disc 12 (and assuming there is no HIGH-SPEED command on its input line 24, i.e., $\overline{FB.HS}$), the machine immediately switches to state $CR_{12}$, and in doing so it sets the timer (64, FIG. 5) in the speed-limit mode (TIMSL) to generate time signal TIM, e.g. 1 ms.

At the start of the motor rotation, the rotation is sufficiently slow so that the 1 ms time signal TIM runouts before the next feedback pulse FB is generated. The machine changes from state $CR_{12}$ back to state $CR_4$ as soon as the feedback pulse is generated. During this state change, it resets the timer to generate another 1 ms time signal TIM, and also to generate a motion-command-pulse COMO. As soon as it has returned to state $CR_4$, it immediately again changes to state $CR_{12}$, in which state it remains until the generation of the next feedback FB pulse. At that time it returns to state $CR_4$, generates another motion-command-pulse COMO, and resets the timer to generate a new 1 ms time signal TIM.

As the state machine repeats the loop of states $CR_2$ and $CR_{12}$, the motor rapidly accelerates, whereby the interval between the feedback pulses FB ($T_{FB}$) continuously decreases, until the point is reached where this interval is less than the 1 ms timer signal TIM. When this occurs, the machine moves with the next feedback pulse FB out of the above-described loop, and changes from state $CR_{12}$ to state $CR_8$. As soon as the 1 ms timer signal TIM has run-out, it moves from state $CR_8$ back to state $CR_4$, and at that time it generates a motion-command-pulse COMO supplied to the motor. From state $CR_4$ it immediately moves to state $CR_{12}$, resetting the timer.

Thus, during starting conditions as the motor accelerates, the state machine traces the loop $CR_4$, $CR_{12}$, $CR_4$, wherein it generates a motion-command-pulse COMO with each feedback pulse FB and also resets the timer TIM for a 1 ms TIM signal. However, as soon as, and whenever thereafter, the motor exceeds the regulated speed as determined by the interval between feedback pulses being less than 1 ms, the state machine traces the loop $CR_4$, $CR_{12}$, $CR_8$, $CR_4$, wherein it generates a motion-command-pulse COMO upon the run-out of 1 ms, rather than upon the occurrence of a feedback pulse FB. Accordingly, the motor is quickly accelerated to its predetermined regulated speed (loop $CR_4$, $CR_{12}$, $CR_4$), and as soon as, and whenever thereafter, the regulated speed is exceeded, it immediately goes to loop $CR_4$, $CR_{12}$, $CR_8$, $CR_4$ to maintain the regulated speed.

It will thus be seen that the State Machine 60, during the Speed-Regulation mode, always generates one motion-command-pulse COMO for each feedback pulse FB, this being done upon the appearance of each feedback pulse FB when the interval between feedback pulses FB is more than 1 ms (during acceleration), and upon the run-out of the 1 ms time interval between feedback pulses when the interval is less than 1 ms. Accordingly, in this loop the motion-command-pulses COMO are in phase with the feedback pulses FB, as indicated in the state diagram of FIG. 8.

High-Speed Control Loop

When the state machine 60 is in state $CR_4$ and receives a HIGH-SPEED command (HS), via its input line 24, FIG. 5, it immediately moves to state $CR_6$, and at the same time it generates a motion-command-pulse COMO. This occurs before the generation of the next feedback pulse FB, and therefore the COMO pulses are in a one-step-advanced relationship with respect to the feedback pulses FB, as indicated in state $CR_6$ of FIG. 8. This brings the motor to its accelerating mode. The State Machine immediately passes to state $CR_7$, and with the generation of the next feedback pulse FB (assuming the HIGH-SPEED command signal is still present) it returns to state $CR_6$, and in doing so, it generates a motion-command-pulse COMO.

Accordingly, while the HIGH-SPEED command signal is present, the machine moves through the loop of states $CR_6$, $CR_7$, $CR_6$, causing the motor to rapidly accelerate above its predetermined regulated speed. The motor remains in this accelerating mode loop until the HIGH-SPEED command is terminated, and the final speed the motor assumes during this High-Speed operation is limited only by the load it carries.

Deceleration Loop

As soon as the HIGH-SPEED command signal terminates ($\overline{HS}$), the machine moves from state $CR_7$ to state $CR_5$ with the next feedback pulse FB, but in doing so, it does not generate a motion-command-pulse COMO. Thus, the motor rotation is delayed by one increment with respect to the feedback pulses, and is brought back in phase with the feedback pulses.

As soon as the next feedback pulse FB is generated, it moves from state $CR_5$ to state $CR_{13}$, and sets the timer in its speed-limit mode (TIMSL) to produce the 1 ms signal TIM; however, it does not generate a motion-command-pulse COMO, so that the motor is now one-phase-delayed; this brings the motor to its decelerating mode.

The state machine then immediately (before the next feedback pulse FB) passes to state $CR_{15}$. From there it can move either back to state $CR_{13}$, or to state $CR_{14}$. So long as the motor is still running at higher than the predetermined regulated speed, the interval between feedback pulses FB is less than 1 ms, so that with the next feedback pulse FB the machine moves from state $CR_{15}$ back to state $CR_{13}$, generating a motion-command-pulse COMO and resetting the timer TIM with each such state change; in this loop, it immediately moves from state $CR_{13}$ back to state $CR_{15}$. As soon as the interval between the feedback pulses FB becomes greater than 1 ms, determined by the run-out of timer signal TIM before the generation of the next feedback pulse FB, the machine moves with the next feedback pulse FB from state $CR_{15}$ to state $CR_{14}$, generating a motion-command-pulse COMO during this state change.

The machine immediately moves from state $CR_{14}$ to state $CR_{12}$, and at the same time it generates a motion-command-pulse COMO. This occurs before the generation of the next feedback pulse FB, and therefore the machine is brought back in-phase with the feedback pulses.

Stop-Sequence Control Loop

When the STOP command is received by the state machine, the next feedback pulse FB brings it from state $CR_{12}$ to state $CR_{10}$, but no motion-command-pulse is generated so that the machine is now one-phase-delayed. The motor thus starts to decelerate. The -Stop-Sequence control assures that the motor will come to a complete stop after having moved three steps, in each of which it generates a feedback pulse FB, each in turn generating a motion-command-pulse COMO. Thus, the motor comes to a complete stop precisely after having moved 3 increments on the timing disc 12 after receiving the STOP command.

The first such feedback pulse FB, generated when the machine is in state $CR_{10}$, brings it to state $CR_{11}$, and generates a motion-command-pulse COMO. The second feedback pulse FB causes a change from state $CR_{11}$ to state $CR_9$, generating a motion-command-pulse COMO, and at the same time setting timer TIM for its timer stepping-mode (TIMSM), which is 2 ms. The machine immediately moves from state CR9 to state $CR_1$, and from there it can move to state $CR_2$ either through state $CR_3$, or directly, depending on how fast the motor is rotating at this instant.

If the motor is rotating very slowly, for example because of a large load, the 2 ms timer signal TIM runs out before the third and final feedback pulse FB is generated, and when this occurs, the state machine moves from state $CR_1$ to state $CR_3$, generating at that time the third and final motion-command-pulse COMO; and as soon as the third feedback pulse FB has been generated, it moves to state $CR_2$. On the other hand, if the motor at the instant it is in state $CR_1$ is rotating more rapidly, the third and final feedback pulse FB will be generated before the 2 ms timer signal TIM runs out; in that case the State Machine moves directly from state $CR_1$ to $CR_2$, and at that time it generates the third and final motion-command-pulse COMO.

The foregoing arrangement assures that the motor comes to a complete stop after precisely traversing three steps subsequent to receiving the STOP command, so that the motor rotation never loses its position with respect to the feedback pulses FB.

From state $CR_2$, the motor immediately goes to its normal rest state CRO, in which state the limited-current LC signal is generated to produce a holding torque in the motor. When arriving into state $CR_2$, either from state $CR_1$ or from state $CR_3$ as described above, the timer is set for the timer limited-current mode (TMLC), producing a 40 ms TIM signal. So long as this 40 ms TIM signal has not run-out, the motor cannot move from state CRO to state $CR_4$ even should a START command be received. This timer signal thereby disables the restarting of the motor for a period of 40 ms to prevent false starting by signals which may be generated as the motor comes to a complete stop.

Many variations, modifications and other applications of the illustrated embodiments will be apparent.

What is claimed is:

1. A motor drive system for driving a motor incrementally in accordance with the generation of motion-command-pulses supplied thereto, the drive system comprising a motor-starting and speed-regulation control including:

motor-rotation sensing means for sensing the rotation of the motor and generating in response thereto a feedback pulse for each movement of the motor a predetermined increment;

timing means for measuring a predetermined time interval after the starting of the timing means;

means for starting the timing means with each generation of a feedback pulse; and means for comparing the length of said predetermined time interval to the length of the time interval between consecutive feedback pulses and for generating a motion-command-pulse at the end of the longer of either said predetermined time interval or said time interval between consecutive feedback pulses; whereby the motor rotates at a speed limited to a regulated speed in which the time of each increment of movement is not less than said predetermined time interval.

2. A motor drive system as defined in claim 1, further comprising a high-speed control including means effective upon the receipt of a HIGH-SPEED command, when the motor is operating at its predetermined regulated speed, to immediately generate an extra motion-command-pulse before the generation of the motion-command-pulse by the next feedback pulse, and to disable said timing means starting means so that only said feedback pulses generate motion-command-pulses, whereby the motion-command-pulses are in a one-phase-advanced relationship with respect to said feedback pulses, which accelerates the motor to a speed above its predetermined regulated speed.

3. A motor drive system as defined in claim 2, further comprising a deceleration control including means effective upon the receipt of a DECELERATION command, when the motor is operating at its high-speed, to cause the next two feedback pulses to skip the generation of a motion-command-pulse, whereby the motion-command-pulses are in a one-phase-delayed relationship with respect to said feedback pulses, which decelerates the motor to its predetermined regulated speed.

4. A motor drive system as defined in claim 1, further comprising a stop control including means effective upon the receipt of a STOP command when the motor is operating at its predetermined regulated speed to cause the next feedback pulse to skip the generation of a motion-command-pulse, whereby the motion-command-pulses are in a one-phase-delayed relationship with respect to said feedback pulses, which decelerates the motor from its predetermined regulated speed.

5. A motor drive system as defined in claim 4, wherein said stop control further includes means for effecting a complete stop of the motor at the end of a predetermined number $n$ of feedback pulses, producing $n$ motion-command- pulses subsequent to the one skipped following the STOP command.

6. A motor drive system as defined in claim 1, wherein said motor-rotation sensing means comprises:

a timing disc driven by the motor and including evenly spaced sensible elements around the periphery thereof, and a sensor sensing said elements and generating feedback pulses at a rate corresponding to the actual speed of rotation of the motor.

7. A motor drive system as defined in claim 6, wherein said sensible elements are teeth of magnetic material carried on the timing disc, and said sensor is a magnetic pick-up device.

8. A motor drive system as defined in claim 1, wherein said control is implemented by a synchronous sequential machine having a static logic gating matrix and a plurality of clocked delay elements, the output of the logic gating matrix being fed to the delay elements, and the outputs of the latter elements being fed back to the input of the logic gating matrix.

9. A motor drive system as defined in claim 1, wherein said means generating motion-command-pulses selectively generates pulses of a predetermined amplitude to produce a driving torque by the motor, or pulses of a limited amplitude to produce a holding torque by the motor.

10. A motor drive system for driving a motor incrementally in accordance with the generation of motion-command-pulses supplied thereto, the drive system comprising a motor-starting and speed-regulation control including:

motor-rotation sensing means for sensing the rotation of the motor and generating in response thereto a feedback pulse for each movement of the motor a predetermined increment;

first timing means for measuring a first predetermined time interval after the starting of the first timing means;

means for starting the first timing means with each generation of a feedback pulse; and means effective upon the generation of each feedback pulse or the run-out of the first predetermined time interval, whichever occurs later, for generating a motion-command-pulse and for restarting the first timing means; and stop control means comprising:

i. means effective upon the receipt of a STOP command to cause the next feedback pulse to skip the generation of motion-command-pulse;

ii. means effective upon the generation of each feedback pulse subsequent to the one skipped following the STOP command for generating a motion-command-pulse;

iii. means effective upon the generation of the $n-1$ th one of said latter feedback pulses for starting a second timing means to measure a second predetermined time interval;

iv. and means effective to generate the $n$ th motion-command- pulse upon the run-out of either said second predetermined time interval or the generation of the $n$ th feedback-pulse, whichever occurs sooner.

11. A motor drive system as defined in claim 10, wherein $n$ equals 3.

12. A motor drive system as defined in claim 10, further including:

means effective upon the generation of the $n$ th feedback pulse subsequent to the one skipped by the STOP command for starting said timing means to measure a third predetermined time interval, and means for disabling the restarting of the motor until the run-out of said third predetermined time interval.

13. A motor drive system for driving a motor incrementally in accordance with motion-command-pulses supplied thereto at times not less than a preselected interval after the preceeding motion command pulse comprising:

motor rotation sensing means sensing the rotation of the motor and generating in response thereto a feedback pulse for each movement of the motor a predetermined increment;

a speed regulation control including means for generating a motion-command-pulse either for each feedback pulse or at end of said preselected time interval, whichever is later;

acceleration control including means effective upon the receipt of an ACCELERATION command for generating an extra motion-command-pulse, to thereby bring the motion-command-pulses into a one-phase-advanced relationship with respect to the feedback pulses; and a deceleration control including means effective upon the receipt of a DECELERATION command for causing the next two feedback pulses to skip the generation of a motion-command-pulse.

14. A motor drive system as defined in claim 13, wherein said speed-regulation control includes timing means for measuring a predetermined time interval after the starting of the timing means; and means effective upon the generation of each feedback pulse or the run-out of the predetermined time interval, whichever occurs later, for generating a motion-command-pulse and for restarting the timer; whereby the motor rotates one increment for each feedback pulse but its speed is limited to a predetermined regulated speed in which the time of each increment of movement is not less than said predetermined time interval.

15. A motor drive system as defined in claim 13, further comprising a stop control including means effective upon the receipt of a STOP command when the motor is operating at its predetermined regulated speed to cause the next feedback pulse to skip the generation of a motion-command- pulse, whereby the motion-command-pulses are in a one-phase- delayed relationship with respect to said feedback pulses, which decelerates the motor from its predetermined regulated speed.

16. A motor drive system as defined in claim 13, wherein said stop control further includes means for effecting a complete stop of the motor at the end of a predetermined number $n$ of feedback pulses producing $n$ motion-command-pulses subsequent to the one skipped following the STOP command.

17. A motor drive system as defined in claim 13, wherein said control is implemented by a synchronous sequential machine having a static logic gating matrix and a plurality of clocked delay elements, the output of the logic gating matrix being fed to the delay elements, and the outputs of the latter elements being fed back to the input of the logic gating matrix.

18. A motor drive system as defined in claim 13, wherein said means generating motion-command-pulses selectively generates pulses of a predetermined amplitude to produce a driving torque by the motor, or pulses of a limited amplitude to produce a holding torque by the motor.

19. A motor drive system for driving a motor incrementally in accordance with the generation of motion-command-pulses supplied thereto, comprising:

motor-rotation sensing means for sensing the rotation of the motor and for generating in response thereto a feedback pulse for each movement of the motor a predetermined increment;

a speed-regulation control means including means for generating a motion-command-pulse for each feedback pulse;

acceleration control means including means effective upon the receipt of an ACCELERATION command for generating an extra motion-command-pulse, to thereby bring the motion-command-pulses into a one-phase-advanced relationship with respect to the feedback pulses;

a deceleration control means including means effective upon the receipt of a DECELERATION command for causing the next two feedback pulses to skip the generation of a motion-command-pulse, and a stop control means including:
   i. means effective upon the receipt of a STOP command to cause the next feedback pulse to skip the generation of a motion-command-pulse;
   ii. means effective upon the generation of each feedback pulse subsequent to the one skipped following the STOP command for generating a motion- command-pulse;
   iii. means effective upon the generation of the $n-1$ th one of said latter feedback pulses for starting a timing means to measure a predetermined time interval; and
   iv. means effective to generate the $n$ th motion-command- pulse upon the run-out of either said predetermined time interval or the generation of the $n$ th motion-command-pulse whichever occurs sooner.

20. A motor drive system as defined in claim 21, wherein $n$ equals 3.

21. A motor drive system for driving a motor incrementally in accordance with the generation of motion-command- pulses applied thereto, the drive system comprising:

motor rotation sensing means for sensing the rotation of the motor and generating in response thereto a feedback pulse for each movement of the motor a predetermined increment; and stop control means including:
   i. means effective upon the receipt of a STOP command to cause the next feedback pulse to skip the generation of a motion command pulse;
   ii. means effective upon the generation of each feedback pulse subsequent to the one skipped following the STOP command for generating a motion-command- pulse;
   iii. means effective upon the generation of the $n-1$ th one of said latter feedback pulses for starting a timing means to measure a predetermined time interval; and
   iv. means effective to generate the $n$ th motion-command- pulse upon the run-out of either said predetermined time interval or the generation of the $n$ th feedback-pulse, whichever occurs sooner.

22. A motor drive system as defined in claim 21, further including:

means effective upon the generation of the $n$ th feedback pulse subsequent to the one skipped by the STOP command for starting said timing means to measure a third predetermined time interval, and means for disabling the restarting of the motor until the run-out of said third predetermined time interval.

23. A motor drive system as defined in claim 21, wherein said means generating motion-command-pulses selectively generates pulses of a predetermined amplitude to produce a driving torque by the motor, or pulses of a limited amplitude to produce a holding torque by the motor.

24. A motor drive system for driving a motor incrementally in accordance with the generation of motion-command-pulses supplied thereto, comprising:

motor-rotation sensing means for sensing the rotation of the motor and for generating in response thereto a feedback pulse for each movement of the motor a predetermined increment;

a speed-regulation control including means for generating a motion-command-pulse for each feedback pulse;

acceleration control including means effective upon the receipt of an ACCELERATION command for generating an extra motion-command-pulse, to thereby bring the motion-command-pulses into a one-phase advanced relationship with respect to the feedback pulses;

a deceleration control including means effective upon the receipt of a DECELERATION command for causing the next two feedback pulses to skip the generation of a motion-command-pulse; and a stop control means including:
 i. means effective upon the receipt of a STOP command when the motor is operating at its predetermined regulated speed to cause the next feedback pulse to skip the generation of a motion-command- pulse;
 ii. means for effecting a complete stop of the motor at the end of a predetermined number $n$ of feedback pulses producing $n$ motion-command-pulses subsequent to the one skipped following the STOP command;
 iii. means effective upon the generation of the $n$ th feedback pulse subsequent to the one skipped by the stop command for starting a timing means to measure a predetermined time interval; and
 iv. means for disabling the restarting of the motor until the run-out of said predetermined time interval.

25. A motor drive system for driving a motor incrementally in accordance with the generation of motion-command-pulses supplied thereto, the drive system comprising a motor-starting control and a control for regulating motor speed so that time intervals between consecutive motion-command-pulses are not less than a predetermined time interval, including:

motor rotation sensing means including a timing disc driven by the motor for sensing the rotation of the motor and generating in response thereto a feedback pulse for each predetermined increment of movement of the motor;

timing means for measuring said predetermined time interval after the starting of the timing means;

means for starting the timing means with each generation of a feedback pulse; and means for comparing the length of said predetermined time interval to the length of the time interval between consecutive feedback pulses and for generating a motion-command-pulse at the end of the longer of either said predetermined time interval or said time interval between consecutive feedback pulses.

* * * * *